(12) United States Patent
Chen et al.

(10) Patent No.: US 9,175,624 B2
(45) Date of Patent: Nov. 3, 2015

(54) EXHAUST GAS RECIRCULATION CONTROL METHOD AND SYSTEM

(71) Applicants: Gang Chen, Rochester Hills, MI (US); Drushan Mavalankar, Rochester Hills, MI (US); Hussein Dourra, Bloomfield, MI (US)

(72) Inventors: Gang Chen, Rochester Hills, MI (US); Drushan Mavalankar, Rochester Hills, MI (US); Hussein Dourra, Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 391 days.

(21) Appl. No.: 13/718,454

(22) Filed: Dec. 18, 2012

(65) Prior Publication Data

US 2014/0165976 A1    Jun. 19, 2014

(51) Int. Cl.
*F02D 41/00* (2006.01)
*F02D 41/14* (2006.01)

(52) U.S. Cl.
CPC ........ *F02D 41/0072* (2013.01); *F02D 41/0077* (2013.01); *F01N 2560/02* (2013.01); *F01N 2560/07* (2013.01); *F02D 2041/0075* (2013.01); *F02D 2041/141* (2013.01); *F02D 2041/1409* (2013.01); *Y02T 10/47* (2013.01)

(58) Field of Classification Search
CPC ............ F01N 2560/02; F01N 2560/07; F02D 41/0072; F02D 41/0075; F02D 41/0077; F02M 25/0761
USPC ........................ 123/568.11–568.32; 701/108; 73/114.32, 114.71, 114.47
See application file for complete search history.

(56) References Cited

U.S. PATENT DOCUMENTS

| 5,724,950 | A  | * | 3/1998 | Shino et al. ................... 123/676 |
| 5,918,582 | A  | * | 7/1999 | Itoyama et al. .......... 123/568.29 |
| 6,370,935 | B1 | * | 4/2002 | He et al. ......................... 73/1.34 |
| 6,564,784 | B1 | * | 5/2003 | Onodera et al. ......... 123/568.12 |
| 6,742,335 | B2 | * | 6/2004 | Beck et al. ................... 60/605.2 |
| 6,802,302 | B1 | * | 10/2004 | Li et al. .................... 123/568.16 |
| 6,820,600 | B1 | * | 11/2004 | Sisken et al. ............. 123/568.21 |
| 6,868,329 | B2 | * | 3/2005 | Ito et al. ........................ 701/108 |

(Continued)

FOREIGN PATENT DOCUMENTS

| DE | 102007007945 |   * | 8/2008 |
| DE | 102007007945 | A1 | 8/2008 |
| DE | 102013202640 | A1 | 8/2013 |

(Continued)

OTHER PUBLICATIONS

International Search Report and Written Opinion dated Mar. 21, 2014 for International Application No, PCT/US2013/075679.

(Continued)

*Primary Examiner* — Lindsay Low
*Assistant Examiner* — Robert Werner
(74) *Attorney, Agent, or Firm* — Ralph E. Smith

(57) ABSTRACT

A system and method for controlling an exhaust gas recirculation valve during transient cycles of engine operation to improve fuel consumption efficiency. The system and method includes first determining a flow rate of total mass out of the intake manifold of the combustion engine and the current mass fraction of exhaust gas in the intake manifold of the combustion engine, calculating a mass flow rate for exhaust gas into the intake manifold that is based on the flow rate of total mass out of the intake manifold and the current mass fraction of exhaust gas in the intake manifold, and actuating a control valve to a position based on the calculated mass flow rate for exhaust gas into the intake manifold.

20 Claims, 4 Drawing Sheets

(56) References Cited

U.S. PATENT DOCUMENTS

| | | | |
|---|---|---|---|
| 7,784,451 B2 * | 8/2010 | Chi | 123/568.19 |
| 8,103,427 B2 * | 1/2012 | Osburn et al. | 701/108 |
| 8,571,818 B2 * | 10/2013 | Fontvieille | 702/47 |
| 8,620,499 B2 * | 12/2013 | Tomatsuri et al. | 701/22 |
| 2009/0132153 A1 * | 5/2009 | Shutty et al. | 701/108 |
| 2013/0226435 A1 * | 8/2013 | Wasberg et al. | 701/102 |

FOREIGN PATENT DOCUMENTS

FR　　2872220 A1 * 12/2005

OTHER PUBLICATIONS

John B. Heywood, Internal Combustion Engine Fundamentals, Jan. 2, 1988, McGraw-Hill Book Company, New York, US, XP007922576, pp. 225-230-906-910, paragraph 6.3.2.

* cited by examiner

EXHAUST GAS RECIRCULATION CONTROL METHOD AND SYSTEM

FIELD

The present disclosure relates to a control system and method for exhaust gas recirculation and, more particularly, to a system and method for controlling an exhaust gas recirculation valve during transient cycles of engine operation to improve fuel consumption efficiency.

BACKGROUND

Traditionally, many internal combustion engines are typically provided with an exhaust gas recirculation ("EGR") system to recirculate a portion of the exhaust gas to an intake passage to control the emission and suppress the generation of $NO_x$ by lowering maximum combustion temperature and to improve fuel consumption by reducing pumping loss. In such EGR systems, a recirculation control valve for controlling the flow of the recirculation exhaust gas is typically positioned at or near the cylinder head of the internal combustion engine. Moreover, a recirculation exhaust gas inlet through which part of the exhaust gas flowing through an exhaust passage is extracted is formed in an exhaust manifold or an exhaust pipe of the engine.

Recently, in some engine designs, cooled EGR can be used to increase the fuel efficiency since the addition of cooled EGR substantially reduces the knock tendency of the engine, resulting in a potential to increase the engine compression ratio and an opportunity to improve combustion phasing and combustion cycle efficiency. Combining advanced combustion phasing with increased specific heat of the fuel-air mix results in a substantial decrease in combustion temperatures which reduces the need for a rich mixture at even the highest power levels.

A block diagram of an exemplary EGR system is shown in FIG. 1 (prior art). As shown, the EGR system includes a four-cycle engine 1 for automobiles, powered by the combustion of a gas mixture comprising fuel and air. Specifically, an intake pipe line 2 (i.e., an intake runner) is connected to the engine 1 and provided to supply air to the engine 1. Moreover, an intake manifold 10 is provided from which the intake pipe line 2 extends. As known to those skilled in the art, the intake manifold 10 receives air from the outside that is filtered by an air cleaner 3 (e.g., an air filter) to remove dust contained in the outside air as well as for feeding air to the intake line 2 via the intake manifold 10. Furthermore, a throttle valve 5 is provided for regulating the amount of air that is fed into the intake manifold 10 and a fuel injector 4 is provided on the intake line 2 for injecting fuel including gasoline into the engine 1. Alternatively, the engine 1 can have a fuel injector 4' located at a position where fuel is injected directly to the combustion chamber or sub-combustion chamber. Further, an exhaust pipe line 6 is connected to the engine 1 to expel the exhaust gas generated by combustion in the engine 1, and a purifying apparatus 7 (e.g., a catalytic converter) is positioned at the opposing end of the exhaust line 6 to purify the exhaust gas before it is forced out of the tailpipe (not shown).

As further shown, engine 1 includes a combustion chamber 1a, an intake valve 1b for closing communication between the intake line 2 and the combustion chamber 1a, an exhaust-gas valve 1c for closing communication between the exhaust pipe line 6 and the combustion chamber 1a, and a piston 1d which moves vertically in the combustion chamber 1a during operation. The operation of engine 1 is known to those skilled in the art and will not be repeated herein. It should also be appreciated that while only one engine cylinder is shown, the engine configuration contemplated herein is for a four cylinder engine, V6 engine, V8 engine or the like and that the single cylinder is shown in FIG. 1 only for illustrative purposes.

The EGR components of the system include an EGR valve 8, an exhaust gas intake pipe line 15, an EGR pipe line 16 and a control unit 18. The exhaust gas intake pipe line 15 extends from the exhaust line 6 and is provided to transfer the exhaust gas to the EGR pipe line 16 to recirculate the exhaust gas to the intake manifold 10. Further the control unit 18 is provided to control the EGR valve 8 by outputting a control signal in response to the running state of the engine. Such controls can typically be based on engine operation conditions, including the temperature of engine coolant, the number of engine rotations and the degree of opening the injector (amount of fuel injection). Once the EGR valve is opened (or its positioned is changed) in response to the control signal, exhaust gas flows into the EGR pipe line 16 and returns to the engine combustion chamber 1a through the intake manifold 10 and the intake line 2. Consequently, combustion in the automobile four-cycle engine 1 is suppressed by the amount of non-flammable exhaust gas returned to the combustion chamber 1a. As discussed above, some designs include an EGR cooler 17 that can be provided on exhaust gas intake pipe line 15 to cool the exhaust gas before it is introduced into the intake manifold 10.

In conventional EGR systems, assuming an instantaneous responsive EGR valve, the EGR mass flow rate into the intake manifold 10 equals the total mass flow rate out of the intake manifold 10 into the engine 1 multiplied by the desired mass fraction in the intake manifold. The EGR mass flow rate can be mathematically described by equation (1) as follows:

$$\dot{m}_{ie} = X_{de} \cdot \dot{m}_{ot} \quad (1)$$

where,
  $\dot{m}_{ie}$ is the EGR mass flow rate into the intake manifold;
  $\dot{m}_{ot}$ is the total mass flow rate out of the intake manifold and into the engine cylinder; and
  $X_{de}$ is the desired EGR mass fraction in the intake manifold.

The desired EGR mass fraction $X_{de}$ is a variable value that is determined by the engine manufacturer to maximize fuel consumption efficiency based on operating conditions. In order to achieve the desired EGR mass fraction $X_{de}$, the EGR control valve is electronically actuated by the control unit 18 to varying predefined positions to control the amount of exhaust gas that is recirculated back into the intake manifold 10 via the EGR pipe line 16. The position of the EGR control valve will vary depending on engine operating conditions as discussed above and as would be known to those skilled in the art.

Once the EGR control valve is actuated to a defined position and the exhaust gas is introduced into the intake manifold 10, the amount of exhaust gas (i.e., EGR mass) in the intake manifold 10 increases or decreases in proportion to the amount of air being introduced through the intake lines. The current EGR mass fraction in the intake manifold can be represented by equation (2) as follows:

$$X_{ce} = \frac{m_e}{m_u + m_a} \quad (2)$$

where,
  $X_{ce}$ is the current EGR mass fraction in the intake manifold;
  $m_e$ is the current EGR mass in the intake manifold; and
  $m_a$ is the current mass of air in the intake manifold.

Based on the foregoing, it should be appreciated that the EGR mass flow out of the intake manifold $\dot{m}_{oe}$ is the current EGR mass fraction $X_{ce}$ multiplied by the total mass flow rate $\dot{m}_{ot}$. This result can be represented by equation (3) as follows:

$$\dot{m}_{oe} = X_{ce} \cdot \dot{m}_{ot} \quad (3)$$

where,
- $\dot{m}_{oe}$ is the current EGR mass flow rate out of the intake manifold;
- $\dot{m}_{ot}$ is the total mass flow rate out of the intake manifold; and
- $X_{ce}$ is the current EGR mass fraction in the intake manifold.

When the engine is operating at a steady state, the current EGR mass fraction $X_{ce}$ will equal the desired EGR mass fraction $X_{de}$ because the EGR flow rate into the intake manifold $\dot{m}_{ie}$ will be constant and equal to the EGR flow rate out of the intake manifold $\dot{m}_{oe}$. However, during a transient cycle of the engine, for example when the engine load is increasing or decreasing during engine acceleration or deceleration, the EGR flow rate will be changing in response to a change in the throttle position. Generally, the rate of change of EGR mass in the intake manifold can be represented by equation (4) as follows:

$$\frac{dm_{egr}}{dt} = \dot{m}_{ie} - \dot{m}_{oe} \quad (4)$$

This equation is defined by the EGR mass flow rate out of the intake manifold $\dot{m}_{oe}$ subtracted from the EGR mass flow rate into the intake manifold $\dot{m}_{ie}$. Thus, during engine acceleration, the throttle is open, which results in an increase in the mass flow rate out of the intake manifold $\dot{m}_{ot}$ and, therefore, a higher EGR mass flow rate into the intake manifold $\dot{m}_{ie}$. Alternatively, during engine deceleration, the throttle is closed, which effectively decreases the total mass flow rate out of the intake manifold $\dot{m}_{ot}$ leading to a lower EGR mass flow rate into the intake manifold $\dot{m}_{ie}$.

Next, the rate of change of EGR mass in the intake manifold can further be represented in terms of desired EGR mass fraction $X_{de}$ and actual EGR mass fraction $X_{ce}$ by substituting the foregoing equations (1) and (3) into equation (4) to derive the following equation:

$$\frac{dm_{egr}}{dt} = (X_{de} - X_{ce}) \cdot \dot{m}_{ot} \quad (5)$$

where,
- $X_{de}$ is the desired EGR mass fraction in the intake manifold;
- $X_{ce}$ is the current EGR mass fraction in the intake manifold;
- $\dot{m}_{ot}$ is the total mass flow rate out of the intake manifold; and $$\frac{dm_{egr}}{dt}$$

is the current rate of change of EGR mass in the intake manifold.

As discussed above, when the engine is operating in a transient state, for example when the engine is accelerating or decelerating, engine manufacturers typically design engines to increase or decrease EGR flow to maximize fuel consumption efficiency. For example, as shown in FIG. 2 (prior art), at approximately the 17 second mark, the engine switches from a low load to a high load (i.e., engine acceleration), and the desired EGR flow rate EGR_des is designed to increase from slightly under 20 g/s to 40 g/s. As noted above, this is done by adjusting the position of the EGR control valve to increase the EGR flow rate into the intake manifold 10. Moreover, at approximately the 70 second mark as shown in FIG. 2, the engine load switches to a low load (i.e., engine deceleration) and the desired EGR flow rate EGR_des decreases to the original rate accordingly.

Although the change in desired EGR flow rate EGR_des is almost instantaneous, in actual operation in conventional EGR systems, there is a substantial delay in the actual EGR flow rate EGR_act from reaching the maximum desired rate of 40 g/s. This delay is also shown in FIG. 2 and is a result of the transport delay. In other words, although the EGR control valve opens instantaneously (or close to instantaneously) in response to the change in engine load, the amount of exhaust gas that is actually in the intake manifold 10 at that time is relatively low. Therefore, there is an inherent delay before exhaust gas is expelled into the intake pipeline 2 from the intake manifold 10 because it takes a given amount of time or number of engine cycles before the intake manifold 10 is filled with exhaust gas from EGR pipe line 16 and, thus, exhaust gas is also transferred from the intake manifold 10 into the engine 1. The delay is represented in FIG. 2 as shown for the actual EGR flow rate EGR_act. Moreover, it should be appreciated that the change in EGR mass in the intake manifold dm/dt is indirectly proportional to the derivative of the actual EGR flow rate EGR_act. Therefore, as the actual EGR flow rate EGR_act reaches its desired rate of 40 g/s, the change in EGR mass dm/dt reaches zero. Furthermore, at approximately the 70 second mark when the engine load switches back to a low load during engine deceleration, the change of rate of EGR mass in the intake manifold will be a negative value, before slowly returning to a zero value.

It is further understood to those skilled in the art that during operation of conventional internal combustion engines, and specifically after the exhaust stroke of the combustion cycle, that residual gases (containing combustion products and nitrogen) generally remain in the cylinder. Residual gas affects the engine combustion processes (and therefore emissions and performance) through its influence on charge mass, temperature and dilution.

In conventional EGR systems, the amount of excess residual gas that collects in the cylinder during a transient cycle of engine operation often increases above stable limits for combustion. For example, as shown in FIG. 3 (prior art), when the engine is operating at a high load with high intake pressure, the amount of residual gas that collects in the cylinder is relatively low because the high intake pressure forces the residual gas through the exhaust port during valve overlap of the exhaust stroke. Once the vehicle decelerates (i.e., decreased engine load), the intake pressure also decreases. As a result of this pressure drop, the concentration of residual gas in the cylinder increases dramatically and quickly. At the same time, the decrease in engine load, which is achieved by closing the throttle valve, also results in a reduction in the EGR flow to the intake manifold 10. However, because the intake manifold 10 is relatively full of exhaust gas at that time, there is a delay before the EGR out of the intake manifold 10 and into the combustion chamber of the engine is realized due to the transport delay discussed above with respect to FIG. 2. Effectively, the concentration of EGR into the cylinder decreases at a rate slower than the concurrent spike in the concentration of residual gas in the cylinder. The combination of EGR and residual gas in the cylinder (i.e., the burned gas) peaks above a stable limit for combustion resulting in operation condition problems, such as engine misfire. Accordingly, what is needed is an EGR control system and method that reduces transient delays for EGR flow rates caused by change in engine operating conditions.

SUMMARY

In one form, the present disclosure provides a system and method for controlling an exhaust gas recirculation valve during transient cycles of engine operation. More particularly, the method comprises determining a total mass flow rate out of the intake manifold and the current mass fraction of exhaust gas in the intake manifold, calculating a mass flow rate for exhaust gas into the intake manifold that is based on the flow rate of total mass out of the intake manifold and the current mass fraction of exhaust gas in the intake manifold, and actuating a control valve to a position based on the calculated mass flow rate for exhaust gas into the intake manifold. By implementing the foregoing, the control system and method is able to achieve an actual EGR flow rate during transient cycles of engine operation that closely resembles the desired EGR flow rate that the prior art EGR systems have failed to realize.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

The control system and method disclosed herein are designed to improve EGR control during the transient cycle of engine operation by adjusting the EGR control valve based on the desired EGR flow rate EGR_des and the rate of change of EGR mass $$\frac{dm_{egr}}{dt}.$$

Figure 2:
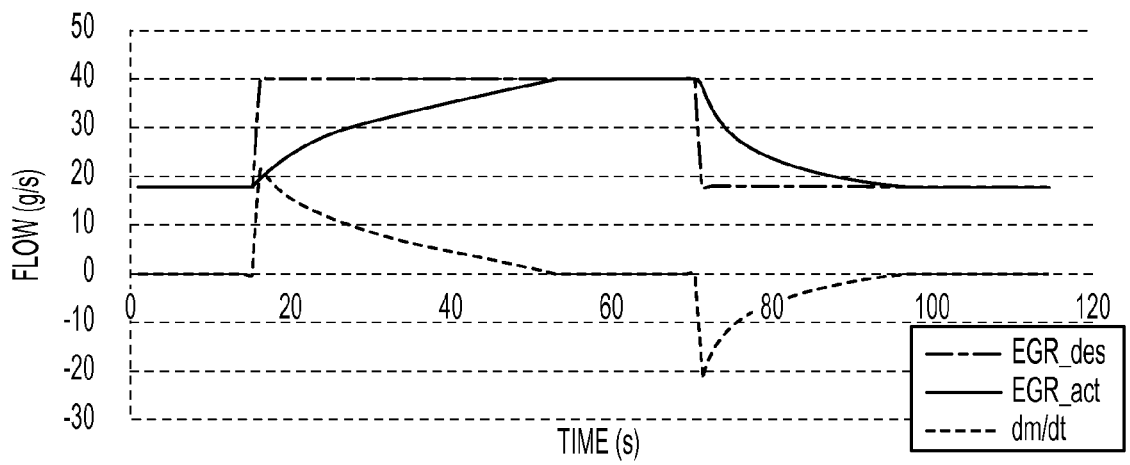
FIG. 2 is a graph illustrating desired and actual EGR flow rates for a conventional exhaust gas recirculation system during transient cycles of engine operation.
Figure 3:
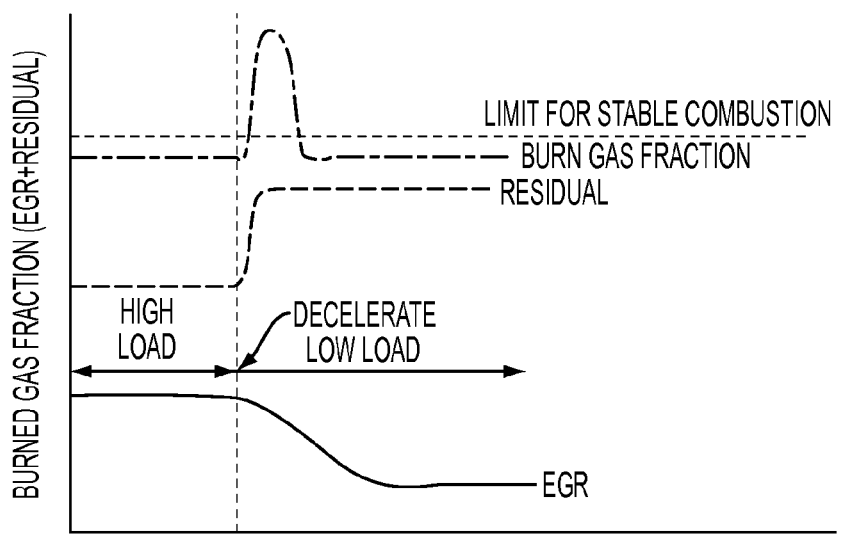
FIG. 3 is a graph illustrating residual gas spikes that occur during transient cycles of engine operation of prior art EGR systems.

As shown in FIG. 2 and discussed above, there is a delay before the actual EGR flow rate EGR_act reaches the desired EGR flow rate EGR_des during transient cycles of engine operation. Moreover, the rate of change of EGR mass dm/dt is indirectly proportional to the actual EGR flow rate EGR_act in the prior art systems. Therefore, the control system and method of the present invention disclosed herein contemplates determining a desired EGR mass flow rate $\dot{m}_{de}$ into the intake manifold by combining the desired EGR flow rate EGR_des with the change in EGR flow rate dm/dt.

Figure 4:
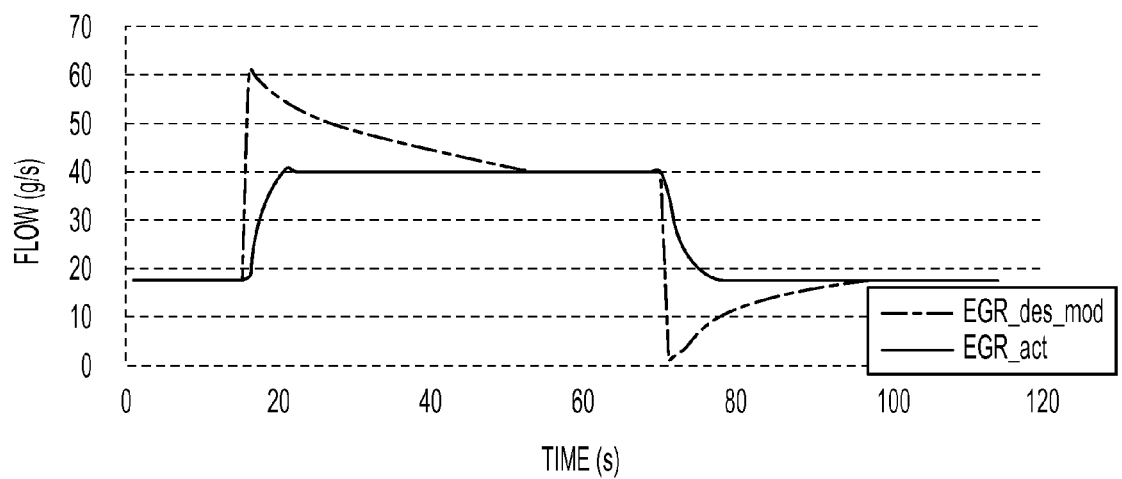
FIG. 4 is a graph illustrating a desired flow rate and the actual EGR flow rate achieved in accordance with an exemplary embodiment of the present invention.

As shown in FIG. 4, the modified desired EGR flow rate EGR_des_mod is modeled based on combining the desired EGR flow rate EGR_des (which is predetermined by the engine manufacturer) with the rate of change of EGR mass dm/dt. As shown, the actual EGR flow rate achieved by modifying the desired EGR flow rate EGR_des with the rate of change of EGR mass dm/dt achieves an actual EGR flow rate EGR_act that substantially mirrors the desired EGR flow rate EGR_des of the prior art systems and shown in FIG. 2.

The calculation for determining the desired EGR mass flow rate $\dot{m}_{de}$ of the current control system and method can be representing by the following equation:

$$\dot{m}_{de} = K_e \cdot \frac{dm_{egr}}{dt} + X_{de} \cdot \dot{m}_{ot} \quad (6)$$

where, $K_e$ is an EGR transient coefficient;

$$\frac{dm_{egr}}{dt}$$

is the rate of change of EGR mass in the intake manifold; and $X_{de} \cdot \dot{m}_{ot}$ is the EGR mass flow rate into the intake manifold.

The EGR transient coefficient $K_e$ (i.e., a calibration constant) is determined during development and calibration of the engine and is selected to tune how quickly or slowly the desired EGR flow rate should be met. It should be appreciated that the EGR transient coefficient $K_e$ (which is a constant value) is only effective during transient cycles of engine operation because the EGR mass flow rate will be changing and, therefore, the rate of change of EGR mass $$\frac{dm_{egr}}{dt}$$

is a positive or negative value. Alternatively, in a steady state of engine operation, the current rate of change of EGR mass $$\frac{dm_{egr}}{dt}$$

will have a zero value and the EGR transient coefficient $K_e$ will not affect the desired EGR mass flow rate $\dot{m}_{de}$.

Furthermore, by substituting equation (5) into equation (6) for the desired required EGR mass flow rate $\dot{m}_{de}$ and solving the equation, it should be appreciated that the desired EGR mass flow rate $\dot{m}_{de}$ can also be represented by the following equation (7):

$$\dot{m}_{de} = \{(K_e+1) \cdot X_{de} - K_e \cdot X_{ce}\} \cdot \dot{m}_{ot} | \dot{m}_{de} \geq 0 \quad (7)$$

Accordingly, based on the foregoing equations (6) or (7), the desired EGR mass flow rate $\dot{m}_{de}$ can be obtained during engine operation based on total mass flow rate out of the intake manifold $\dot{m}_{ot}$ and the current EGR mass fraction in the intake manifold $X_{ce}$, which can be estimated by the vehicles computer or measured by a sensor in the intake manifold. As noted above, $X_{de}$ is the desired EGR mass fraction in the intake manifold, which is predetermined by the engine manufacturer and is, for example, typically 15%, but can be between 0-40%. Moreover, $K_e$ is an EGR transient coefficient (i.e., a calibration constant), preferably between a value of 0 and 1, but can be greater than 1 in certain embodiments.

Upon determining the desired EGR mass flow rate $\dot{m}_{de}$, the EGR valve position can be determined by calculating the required EGR valve discharge coefficient area $(C_dA)_{egr}$ of the EGR control valve opening necessary to obtain the desired EGR mass flow rate $\dot{m}_{de}$. Specifically, applying equation (8) as follows, which determines the compressible flow through the EGR control valve to achieve the desired EGR mass flow rate, the product of the discharge coefficient and EGR flow area $(C_dA)_{egr}$ can be determined:

$$\dot{m}_{de} = (c_dA)_{egr} \cdot \frac{P_{exh}}{\sqrt{R_{exh} \cdot T_{exh}}} \cdot \left(\frac{P_{in}}{P_{exh}}\right)^{\frac{1}{\gamma}} \cdot \left\{\frac{2\gamma}{\gamma-1} \cdot \left[1 - \left(\frac{P_{in}}{P_{exh}}\right)^{\frac{\gamma-1}{\gamma}}\right]\right\}^{\frac{1}{2}} \quad (8)$$

where,
- $P_{exh}$ is the exhaust pressure (upstream of the EGR control valve);
- $P_{in}$ is the intake pressure (downstream of the EGR control valve);
- $R_{exh}$ is the exhaust gas constant;
- $T_{exh}$ is the exhaust temperature; and
- $\gamma$—is the ratio of specific heat.

Once the product of the discharge coefficient and EGR flow area $(C_dA)_{egr}$ is determined based on the desired EGR mass flow rate $\dot{m}_{de}$ using equation (8), the control system and method accesses a lookup table to determine the required EGR valve position. Using the required EGR valve position, the control system then electronically (or mechanically) adjusts the position of the EGR control valve to achieve the desired EGR mass flow rate $\dot{m}_{de}$ into the intake manifold. Applying the foregoing, the position of the EGR control valve can be continuously adjusted during the transient cycle of the engine operation according to the foregoing equations to achieve the desired mass flow rate $\dot{m}_{de}$ that causes the actual EGR flow rate EGR_act to mirror the desired EGR flow rate of the prior art systems, as illustrated by EGR_des in FIG. 2, for example.

Figure 1:
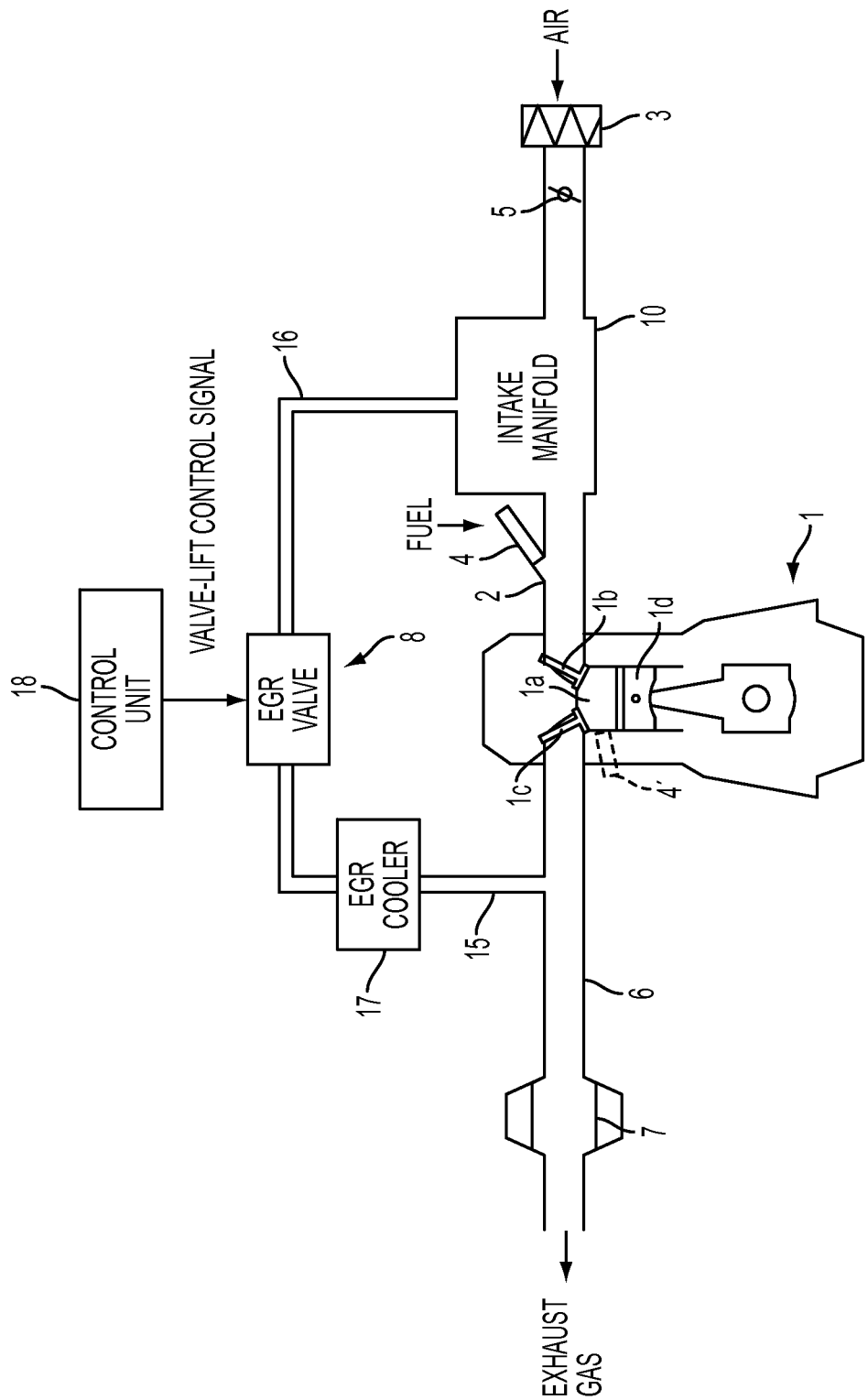
FIG. 1 is a block diagram showing an example of a conventional exhaust gas recirculation system.

It should be appreciated that the processing components of the foregoing control system and method are performed by a conventional powertrain control module ("PCM") or the like, which includes an engine control system that is specially programmed to control, inter alia, the EGR control valve according to the foregoing features and instructions and, more particularly, equations 6, 7 and/or 8. For example, the lookup table to determine the EGR valve position will be stored in the memory of the PCM and will be accessed during the transient engine cycles. Once the required EGR valve position is determined, the PCM will send appropriate electronic signals to the EGR control valve to actuate the valve to the desired position to obtain the desired EGR mass flow rate $\dot{m}_{de}$. By implementing the foregoing, the control system and method disclosed herein achieves an actual EGR flow rate during transient cycles of engine operation that closely resembles the desired EGR flow rate that conventional EGR systems fail to realize. It should be generally understood that the mechanical features of the inventive EGR control system and method disclosed herein are the same or similar to the prior art systems, such as the EGR system depicted by the block diagram and FIG. 1 and described above.

Figure 5:
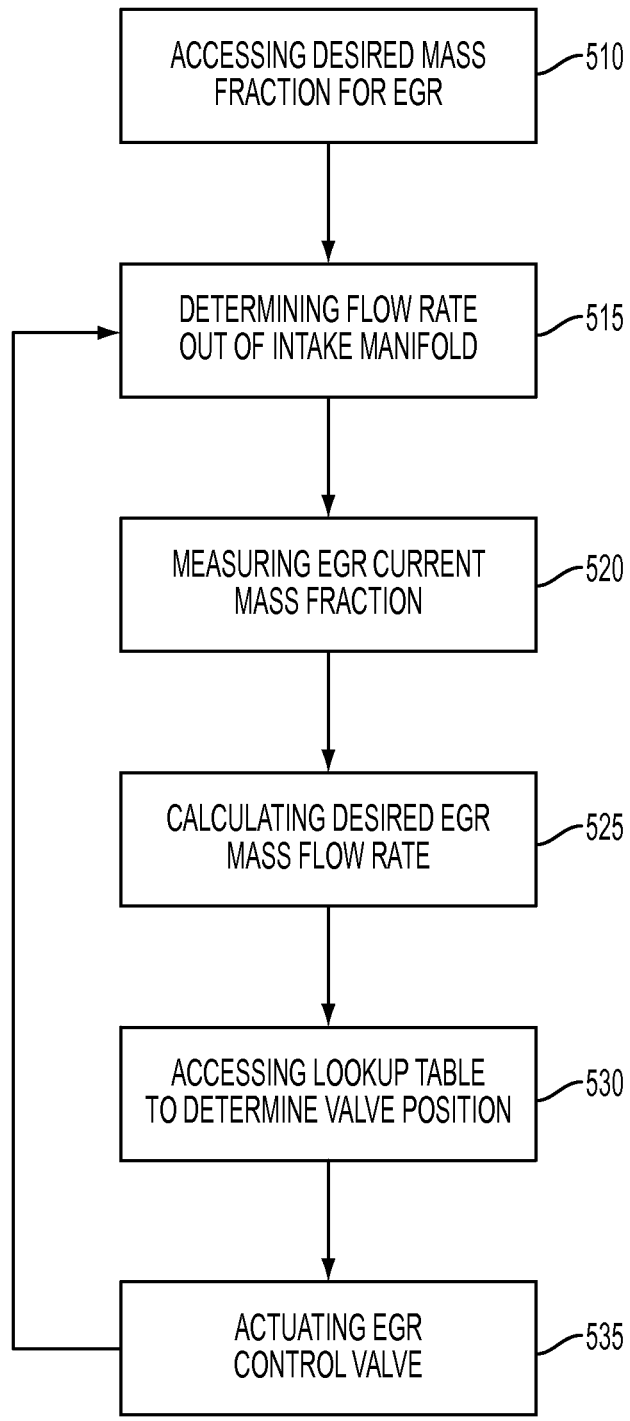
FIG. 5 illustrates a flowchart for EGR transient control method in accordance with an exemplary embodiment of the present invention.

FIG. 5 illustrates a flowchart for EGR transient control method in accordance with an exemplary embodiment of the present invention. Initially, at step 510, a target mass fraction of exhaust gas $X_{de}$ for the intake manifold is accessed from an electronic memory of the vehicles PCM. Next, at step 515, the PCM determines a flow rate of total mass out of the intake manifold $\dot{m}_{ot}$, in which the total mass preferably includes air and exhaust gas. At step 520, the PCM estimates the current mass fraction of exhaust gas $X_{ce}$ in the intake manifold. Alternatively, the current mass fraction of exhaust gas $X_{ce}$ can measured using an EGR sensor positioned in the intake manifold. In either case, using this information, the PCM then calculates the desired mass flow rate for exhaust gas $\dot{m}_{de}$ into the intake manifold (step 525). As noted above, the desired mass flow rate $\dot{m}_{de}$ can be calculated using equations (6) and (7). As noted above, $K_e$ is an EGR transient coefficient that is a calibration constant that is predetermined during development of the engine and is selected to tune how quickly or slowly the desired EGR flow rate should be met. Once the desired mass flow rate $\dot{m}_{de}$ is determined at step 525, a lookup table is accessed by the PCM at step 530 to determine a desired position of the EGR control valve to obtain the desired mass flow rate $\dot{m}_{de}$. As noted above, this is done by calculating the product of the discharge coefficient and EGR flow area $(C_dA)_{egr}$ from equation (8) and applying the value to the lookup table. Finally, at step 535, the PCM sends a control signal to the EGR control valve to set its position accordingly. Based on this position, the control valve is able to regulate the mass flow rate for exhaust gas into the intake manifold to obtain the desired EGR flow rate EGR_des that the prior art systems have failed to achieve. Finally, as shown in FIG. 5, the process repeats itself continuously by measuring the variables of the system and adjusting the valve position accordingly.

What is claimed is:

1. An exhaust gas recirculation method for an internal combustion engine, the method comprising:
   detecting, by a controller of the engine, a transient cycle of the internal combustion engine; and
   in response to detecting the transient cycle of the internal combustion engine:
      obtaining, by a controller of the engine, a target mass fraction of exhaust gas in an intake manifold of the internal combustion engine;
      determining, by the controller, a total mass flow rate out of the intake manifold, the total mass including at least one of air and exhaust gas;
      determining, by the controller, a current mass fraction of exhaust gas in the intake manifold;
      calculating, by the controller, a target mass flow rate for exhaust gas into the intake manifold based on (i) a transient coefficient, (ii) the flow rate of total mass out of the intake manifold, (iii) the target mass fraction of exhaust gas in the intake manifold, and (iv) the current mass fraction of exhaust gas in the intake manifold; and
      actuating, by the controller, a control valve to a position based on the calculated target mass flow rate for exhaust gas into the intake manifold, wherein the control valve is configured to regulate a mass flow rate for exhaust gas into the intake manifold.

2. The exhaust gas recirculation method of claim 1, wherein determining the current mass fraction of exhaust gas in the intake manifold further comprises measuring the current mass fraction using a sensor in the intake manifold.

3. The exhaust gas recirculation method of claim 1, wherein determining the current mass fraction of exhaust gas in the intake manifold further comprises estimating the current mass fraction.

4. The exhaust gas recirculation method of claim 1, wherein the target mass flow rate for exhaust gas into the intake manifold is calculated by the equation $$\dot{m}_{de} = K_e \cdot \frac{dm_{egr}}{dt} + X_{de} \cdot \dot{m}_{ot},$$

wherein, $K_e$ is a calibration coefficient, $$\frac{dm_{egr}}{dt}$$

is a rate of change of the mass of exhaust gas in the intake manifold, $X_{de}$ is the target mass fraction of exhaust gas in the intake manifold, $\dot{m}_{ot}$ is the total mass flow rate mass out of the intake manifold, and the rate of change of the mass of exhaust gas in the intake manifold is based on the current mass fraction of exhaust gas in the intake manifold.

5. The exhaust gas recirculation method of claim 4, further comprising defining, by the controller, the calibration coefficient $K_e$ during engine calibration.

6. The exhaust gas recirculation method of claim 4, further comprising calculating, by the controller, a product of a valve discharge coefficient and flow area $(C_dA)_{egr}$ based on the change in pressure across the control valve and the calculated target mass flow rate for exhaust gas into the intake manifold using the following equation:

$$\dot{m}_{de} = (c_dA)_{egr} \cdot \frac{P_{exh}}{\sqrt{R_{exh} \cdot T_{exh}}} \cdot \left(\frac{P_{in}}{P_{exh}}\right)^{\frac{1}{\gamma}} \cdot \left\{\frac{2\gamma}{\gamma-1} \cdot \left[1 - \left(\frac{P_{in}}{P_{exh}}\right)^{\frac{\gamma-1}{\gamma}}\right]\right\}^{\frac{1}{2}}$$

wherein, $P_{exh}$ is an exhaust pressure of the internal combustion engine, $P_{in}$ is an intake pressure of the intake manifold, $R_{exh}$ is an exhaust gas constant, $T_{exh}$ is an exhaust temperature, and $\gamma$—is a ratio of specific heat of the internal combustion engine.

7. The exhaust gas recirculation method of claim 6, wherein actuating the control valve further comprises accessing a lookup table based on the product of a valve discharge coefficient and flow area $(C_dA)_{egr}$ to determine the position of the control valve.

8. The exhaust gas recirculation method of claim 1, wherein the target mass flow rate for exhaust gas into the intake manifold is calculated by the equation $$\dot{m}_{de} = \{(K_e+1) \cdot X_{de} - K_e \cdot X_{ce}\} \cdot \dot{m}_{ot} | \dot{m}_{de} \geq 0$$

wherein, $K_e$ is a calibration coefficient, $X_{de}$ is the target mass fraction of exhaust gas in the intake manifold, $X_{ce}$ is the current mass fraction of exhaust gas in the intake manifold, and $\dot{m}_{ot}$ is the total mass flow rate out of the intake manifold.

9. The exhaust gas recirculation method of claim 8, further comprising determining, by the controller, the calibration coefficient $K_e$ during engine calibration.

10. The exhaust gas recirculation method of claim 8, further comprising calculating, by the controller, the product of a valve discharge coefficient and flow area $(C_dA)_{egr}$ based on the calculated target mass flow rate for exhaust gas into the intake manifold using the following equation:

$$\dot{m}_{de} = (c_dA)_{egr} \cdot \frac{P_{exh}}{\sqrt{R_{exh} \cdot T_{exh}}} \cdot \left(\frac{P_{in}}{P_{exh}}\right)^{\frac{1}{\gamma}} \cdot \left\{\frac{2\gamma}{\gamma-1} \cdot \left[1 - \left(\frac{P_{in}}{P_{exh}}\right)^{\frac{\gamma-1}{\gamma}}\right]\right\}^{\frac{1}{2}}$$

wherein, $P_{exh}$ is an exhaust pressure of the internal combustion engine, $P_{in}$ is an intake pressure of the intake manifold, $R_{exh}$ is an exhaust gas constant, $T_{exh}$ is an exhaust temperature, and $\gamma$—is a ratio of specific heat of the internal combustion engine.

11. The exhaust gas recirculation method of claim 10, wherein actuating the control valve further comprises accessing a lookup table and applying the product of a valve discharge coefficient and flow area $(C_dA)_{egr}$ to determine the position of the control valve.

12. The exhaust gas recirculation method of claim 1, wherein the target mass fraction of exhaust gas in the intake manifold is between 0 and 40%.

13. The exhaust gas recirculation method of claim 1, further comprising cooling, by an exhaust gas recirculation (EGR) cooler, the exhaust gas.

14. An exhaust gas recirculation system for an internal combustion engine, the exhaust gas recirculation system comprising:

a memory configured to store a target mass fraction of exhaust gas in an intake manifold of the internal combustion engine; and a control unit configured to detect a transient cycle of the internal combustion engine and, in response to detecting the transient cycle of the internal combustion engine:

obtain, from the memory, the target mass fraction of exhaust gas in the intake manifold;

determine a total mass flow rate out of the intake manifold, the total mass including at least one of air and exhaust gas;

determine a current mass fraction of exhaust gas in the intake manifold;

calculate a target mass flow rate for exhaust gas into the intake manifold based on (i) a transient coefficient, (ii) the flow rate of total mass out of the intake manifold, (iii) the target mass fraction of exhaust gas in the intake manifold, and (iv) the current mass fraction of exhaust gas in the intake manifold; and actuate a control valve to a position based on the calculated target mass flow rate for exhaust gas into the intake manifold, wherein the control valve is configured to regulate a mass flow rate for exhaust gas into the intake manifold.

15. The exhaust gas recirculation system of claim 14, wherein the target mass flow rate for exhaust gas into the intake manifold is calculated by the equation $$\dot{m}_{de} = K_e \cdot \frac{dm_{egr}}{dt} + X_{de} \cdot \dot{m}_{ot},$$

wherein,
$K_e$ is a calibration coefficient, $$\frac{dm_{egr}}{dt}$$

is a rate of change of the mass of exhaust gas in the intake manifold,
$X_{de}$ is the target mass fraction of exhaust gas in the intake manifold,
$\dot{m}_{ot}$ is the total mass flow rate mass out of the intake manifold, and
the rate of change of the mass of exhaust gas in the intake manifold is based on the current mass fraction of exhaust gas in the intake manifold.

16. The exhaust gas recirculation system of claim 15, wherein the control unit is further configured to define the calibration coefficient $K_e$ during engine calibration.

17. The exhaust gas recirculation system of claim 15, wherein the control unit is further configured to calculate a product of a valve discharge coefficient and flow area $(C_dA)_{egr}$ based on the change in pressure across the control valve and the calculated target mass flow rate for exhaust gas into the intake manifold using the following equation:

$$\dot{m}_{de} = (c_d A)_{egr} \cdot \frac{P_{exh}}{\sqrt{R_{exh} \cdot T_{exh}}} \cdot \left(\frac{P_{in}}{P_{exh}}\right)^{\frac{1}{\gamma}} \cdot \left\{\frac{2\gamma}{\gamma-1} \cdot \left[1 - \left(\frac{P_{in}}{P_{exh}}\right)^{\frac{\gamma-1}{\gamma}}\right]\right\}^{\frac{1}{2}}$$

wherein,
$P_{exh}$ is an exhaust pressure of the internal combustion engine,
$P_{in}$ is an intake pressure of the intake manifold,
$R_{exh}$ is an exhaust gas constant,
$T_{exh}$ is an exhaust temperature, and
$\gamma$—is a ratio of specific heat of the internal combustion engine.

18. The exhaust gas recirculation system of claim 17, wherein the control unit is further configured to actuate the control valve by accessing a lookup table based on the product of a valve discharge coefficient and flow area $(C_dA)_{egr}$ to determine the position of the control valve.

19. The exhaust gas recirculation method of claim 1, wherein the transient cycle of the internal combustion engine is indicative of an acceleration or deceleration event.

20. An exhaust gas recirculation (EGR) system for an engine, the EGR system comprising:
an EGR valve configured to regulate an amount of exhaust gas recirculated from cylinders of the engine back into an intake manifold of the engine; and
a controller configured to:
detect a transient cycle of the engine, the transient cycle of the engine being indicative of an acceleration or deceleration event;
in response to detecting the transient cycle of the engine:
obtain current and target EGR mass fractions in the intake manifold,
obtain an outflow rate of a gas mixture from the intake manifold into the cylinders,
obtain an inflow rate of air and exhaust gas into the intake manifold from an atmosphere and the cylinders, respectively,
obtain a first target EGR flow rate into the intake manifold based on the current and target EGR mass fractions, the intake manifold inflow and outflow rates, and an EGR transient coefficient that is calibrated for transient cycles of the engine, and
command the EGR valve to a first position based on the first target EGR flow rate; and
when the transient cycle of the engine is not detected:
obtain a second target EGR flow rate based on the target EGR mass fraction, and
command the EGR valve to a second position based on the second target EGR flow rate.

* * * * *